US010820970B2

(12) United States Patent
Kirchner et al.

(10) Patent No.: US 10,820,970 B2
(45) Date of Patent: Nov. 3, 2020

(54) METHOD OF MAKING A DENTAL RESTORATION

(71) Applicant: 3M INNOVATIVE PROPERTIES COMPANY, St. Paul, MN (US)

(72) Inventors: Bastian Kirchner, Fürstenfeldbruck (DE); Malte Korten, Moorenweis (DE); Gallus Schechner, Herrsching (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/500,850

(22) PCT Filed: Apr. 5, 2018

(86) PCT No.: PCT/US2018/026217
§ 371 (c)(1),
(2) Date: Oct. 4, 2019

(87) PCT Pub. No.: WO2018/187545
PCT Pub. Date: Oct. 11, 2018

(65) Prior Publication Data
US 2020/0100863 A1 Apr. 2, 2020

(30) Foreign Application Priority Data
Apr. 7, 2017 (EP) .................... 17165402

(51) Int. Cl.
*A61C 9/00* (2006.01)
*A61C 5/77* (2017.01)
(Continued)

(52) U.S. Cl.
CPC .............. *A61C 9/0046* (2013.01); *A61C 5/77* (2017.02); *A61C 9/004* (2013.01); *A61C 9/0006* (2013.01);
(Continued)

(58) Field of Classification Search
CPC ..... A61C 9/004; A61C 9/0046; A61C 9/0053; A61C 13/0004; A61C 13/0006;
(Continued)

(56) References Cited

U.S. PATENT DOCUMENTS 8,718,982 B2 5/2014 Fisker
8,770,975 B2 7/2014 Waizenegger
(Continued)

FOREIGN PATENT DOCUMENTS

KR 101590140 1/2016
KR 101687821 12/2016
(Continued)

OTHER PUBLICATIONS

International Search Report for PCT International Application No. PCT/US2018/026217, dated Jun. 25, 2018, 7 pages.

*Primary Examiner* — Crystal J Barnes-Bullock

(57) ABSTRACT

A method of making a dental restoration has the steps of: determining a virtual space available for accommodation of a dental restoration for a tooth to be restored; retrieving a predefined virtual master dental restoration surface from a database; fitting the virtual master dental restoration surface in the space to provide a virtual outer dental restoration surface; creating a virtual inner dental restoration surface independent of a shape of the tooth to be restored; providing a virtual model of a dental restoration based on a combination of the virtual outer dental restoration surface and the virtual inner dental restoration surface; and fabricating the dental restoration based on the dental restoration model.

15 Claims, 3 Drawing Sheets

(51) Int. Cl.
*A61C 13/00* (2006.01)
*B33Y 50/00* (2015.01)
*B33Y 80/00* (2015.01)

(52) U.S. Cl.
CPC ........ *A61C 9/0053* (2013.01); *A61C 13/0019* (2013.01); *B33Y 50/00* (2014.12); *B33Y 80/00* (2014.12)

(58) Field of Classification Search
CPC ....... A61C 13/0019; A61C 13/34; A61C 5/77; B33Y 50/00; B33Y 50/02; B33Y 80/00; G05B 19/4097; G05B 2219/45167; G06F 30/00; G06F 30/20; G06T 2207/30036
See application file for complete search history.

(56) References Cited

U.S. PATENT DOCUMENTS

| | | | |
|---|---|---|---|
| 8,897,526 B2 | 11/2014 | MacLoad | |
| 9,642,685 B2 * | 5/2017 | Brodkin | A61C 13/0004 |
| 9,827,076 B2 * | 11/2017 | Korten | A61C 13/34 |
| 10,543,066 B2 * | 1/2020 | Kopelman | A61C 13/0004 |
| 2005/0089822 A1 | 4/2005 | Geng | |
| 2008/0261165 A1 * | 10/2008 | Steingart | A61C 13/0004 433/24 |
| 2012/0296613 A1 * | 11/2012 | Kirchner | A61C 8/005 703/1 |
| 2013/0060532 A1 | 3/2013 | Clausen | |
| 2013/0211242 A1 * | 8/2013 | Bertrand | A61B 6/037 600/424 |
| 2013/0282351 A1 * | 10/2013 | Tank | G06T 7/30 703/11 |
| 2014/0372085 A1 | 12/2014 | Korten | |
| 2018/0071062 A1 * | 3/2018 | Kirchner | A61C 9/0046 |
| 2018/0085203 A1 * | 3/2018 | Ramirez | G06F 30/00 |

FOREIGN PATENT DOCUMENTS

| | | |
|---|---|---|
| WO | WO 2004-044787 | 5/2004 |
| WO | WO 2013-164410 | 11/2013 |
| WO | WO 2013-164411 | 11/2013 |
| WO | WO 2016-153830 | 9/2016 |

* cited by examiner

1

METHOD OF MAKING A DENTAL RESTORATION

FIELD OF THE INVENTION

The invention relates to method of making a dental restoration. In particular, the invention relates to a method in which a dental restoration is made based on a standardized tooth model at a minimum of design steps.

BACKGROUND ART

Dental restorations, in particular larger dental restorations like replacement teeth, crowns or bridges, for example, can be made in different configurations depending on a variety of criteria. Such criteria include for example the desired aesthetics, costs, preparation time or capabilities of a selected manufacturer.

In the adult dentistry dental restorations are typically highly individualized. This means that the dental restorations are typically prepared using a design process in which the inner and outer surfaces of the dental restoration are customized with respect to the tooth or teeth to be restored in a patient's mouth and to teeth adjacent or opposite of the tooth or teeth to be restored. In such a design process virtual wax knife and cusp modification tools typically allow dental restorations to be designed to well resemble the shape of natural teeth. Although such a design process has been traditionally used in dental labs they have meanwhile become available for chairside use, meaning for use in a dentist's office.

In pediatric dentistry the patience and cooperation required from a patient during such a chairside design process typically cannot be expected from children. Therefore in pediatric dentistry pre-fabricated crowns are often used for restoring teeth. On the other hand individualized dental restorations would be generally desired because of their good esthetics and clinical performance.

Although existing methods of making dental restorations provide certain advantages there is still a need for a method of making dental restorations in pediatric dentistry.

SUMMARY OF THE INVENTION

The invention relates to a method of making a dental restoration. The method comprises the steps of:
  determining a virtual space available for accommodation of a dental restoration for a tooth to be restored by capturing the shape of a patient's teeth at least in an area adjacent the tooth to be restored;
  retrieving a predefined virtual master dental restoration surface from a database;
  fitting the virtual master dental restoration surface in the space by three-dimensionally transforming the virtual master dental restoration surface to provide a virtual outer dental restoration surface;
  creating a virtual inner dental restoration surface independent of a shape of the tooth to be restored;
  providing a virtual model of a dental restoration based on a combination of the virtual outer dental restoration surface and the virtual inner dental restoration surface; and
  fabricating the dental restoration based on the dental restoration model.

The invention is advantageous in that it helps minimizing design steps during the making of the dental restoration. Further, the invention is advantageous in that is facilitates the design of the dental restoration. Accordingly, the time for preparing the dental restoration and the time for treating a patient can be minimized.

The shape of the patient's teeth are preferably captured by intra-oral scanning. Alternatively, the shape of the patient's teeth may be captured from scanning a plaster model of the patient's teeth. The plaster model may be obtained by taking a dental impression from the patient's teeth and using the dental impression to cast the plaster model therein. Preferably, the space is defined by a virtual model of the patient's teeth at least in an area adjacent the tooth to be restored. In particular, the model of the patient's teeth may comprise a virtual model of at least one tooth directly adjacent the tooth to be restored, or two teeth directly adjacent the tooth to be restored. The model of the patient's teeth may further comprise a virtual model of an antagonist (tooth opposite) of the tooth to be restored.

The database may store one or a plurality of virtual master dental restoration surfaces. The database may be provided on a computer. A virtual master dental restoration surface is a predetermined surface of a tooth that for example corresponds to an average or typical shape of a certain type of tooth. For example, there may be a virtual master dental restoration surface that resembles an average or typical molar, premolar, incisor or canine. The virtual master dental restoration surface is typically not related to an individual patient but has a standardized shape.

In one embodiment the virtual inner dental restoration surface is automatically generated by a computer, based on the virtual outer dental restoration surface. The virtual inner dental restoration surface may be automatically generated by a computer, based on only the virtual outer dental restoration surface. At least a portion of the virtual inner dental restoration surface may generated as a three-dimensional equidistant reduction of a corresponding portion of the virtual outer dental restoration surface based on an offset value that is representative of a wall thickness of the dental restoration. Alternatively, the entire virtual inner dental restoration surface may generated as a three-dimensional equidistant reduction of the virtual outer dental restoration surface based on an offset value that is representative of a wall thickness of the dental restoration.

The three-dimensional equidistant reduction as referred to herein means that the virtual inner dental restoration surface (or a portion thereof) is created at an equidistant distance inside the virtual outer dental restoration surface. Thus, the virtual inner and outer dental restoration surface are uniformly spaced. The distance between the virtual inner and outer dental restoration surface corresponds to the wall thickness or the offset value. The wall thickness may be between 0.3 mm and 1.5 mm, preferably 0.5 mm.

The method may comprise the step of allowing a user to enter or select the offset value. For example, in the method the user may enter in a computer a particular value that corresponds to the desired wall thickness of the dental restoration, or the user may select such a particular value from a menu in the computer.

The virtual outer dental restoration surface corresponds to a representation of the surface of the dental restoration which faces away from the restored tooth when the dental restoration is affixed to that tooth. Further, the virtual inner dental restoration surface corresponds to a representation of the surface of the dental restoration which faces the restored tooth when the dental restoration is affixed to that tooth.

In an embodiment the three-dimensional transformation is performed by three-dimensionally proportionally scaling of the virtual master dental restoration surface. This means that each of the three dimensions of the shape of the virtual master dental restoration surface is enlarged or reduced by one common factor. Accordingly the shape as such (including its proportions) does not change although the size of that shape is changed. This is in contrast to a three-dimensional equidistant reduction (or enlargement) in which the proportions (of irregular shaped bodies) change.

In a further embodiment the method further comprises the step of determining a height of the dental restoration model independent from (or in absence of) any preparation margin of the tooth to be restored. The dental restoration model has a tooth axis. The tooth axis is a corresponding axis of a tooth axis of a natural tooth, which is defined in the field of dentistry by a center axis extending through the root and the occlusal surface of the tooth. Although the dental restoration model has no root, the position, dimension and inclination of the tooth axis corresponds to the tooth axis of a natural tooth. The height is defined by a dimension (or size) of the dental restoration model along the tooth axis.

In a preferred embodiment the dental restoration is a crown, preferably a crown for a single tooth. Accordingly, the dental restoration model preferably has the shape of a crown, preferably a crown for a single tooth.

In a further embodiment the method further comprises the step of virtually trimming the dental restoration model based on the determined dental restoration height. The trimming is preferably performed by the computer by virtually cutting away that portion of the virtual inner and outer dental restoration surface that extends beyond the height.

The method may comprise the step of closing a gap between a free edge of the virtual inner dental restoration surface and a free edge of the virtual outer dental restoration surface. The free edges may result from trimming the virtual inner and outer dental restoration surface. Preferably the closing of the gap is performed by generating a surface that extends between the edges and bridges the gap by computer aid.

In one embodiment the method further comprises the step of determining a tooth color for the dental restoration. The tooth color may be determined by use of a shade guide, for example a VITA classical A1-D4® or VITA SYSTEM 3D-MASTER®, available from VITA Zahnfabrik H. Rauter GmbH & Co. KG, Germany.

In one embodiment the method further comprises the step of providing a dental material from which the dental restoration is fabricated based on the tooth color. The dental material is preferably a light hardenable resin. The dental material further is preferably suitable for being processed in a 3D printing machine. The dental restoration is further preferably fabricated by 3D printing of the dental material, in particular from the light hardenable resin. A suitable machine for 3D printing of the dental restoration may be based on stereo lithography. An exemplary machine is available under the designation RapidShape S30, from Rapid Shape GmbH, Germany. Although 3D printing is preferred, other fabrication methods are possible. For example milling or grinding the dental restoration from a blank of dental material (for example composite or zirconia).

In one embodiment the light hardenable resin is based on a composition comprising: reactive monomers, photo initiators, optionally inorganic fillers and optionally additives.

In a further embodiment the finished dental restoration has an outer shape that corresponds to the shape of the virtual outer dental restoration surface. The finished dental restoration may have an outer shape that corresponds to the shape of a three-dimensional proportional reduction or enlargement of the surface of the virtual outer dental restoration surface. The latter accounts for any shrinking or swelling that may occur during the fabrication of the dental restoration.

In one embodiment the method further comprises the step of displaying, in combination, (i) the shape of the patient's teeth at least in the area adjacent the tooth to be restored and (ii) the virtual master dental restoration surface, and wherein the fitting of the virtual master dental restoration model into the space is performed by a user by optical control based on the combination (i) and (ii) displayed. The shape of the patient's teeth and the virtual master dental restoration surface may be displayed on a dental CAD System. A used may (if necessary) drag the virtual master dental restoration surface in the space for the dental restoration and resize the virtual master dental restoration surface to fit it into the space. The user preferably does not perform any or any substantial design steps, like for example partially modifying the virtual master dental restoration surface.

In a further embodiment the method is performed prior to any invasive treatment of the tooth to be restored. This means that the teeth of the patient may be captured but the tooth to be restored may not be treated by material removal, for example by grinding, until the dental restoration is finished.

In a further embodiment the terms used above may be designated as follows:
  virtual space or first virtual space;
  dental restoration or first dental restoration;
  tooth to be restored or first tooth to be restored;
  patient's teeth or first patient's teeth;
  virtual outer dental restoration surface or first virtual outer dental restoration surface;
  virtual inner dental restoration surface or first virtual inner dental restoration surface; and
  virtual model of a dental restoration or a virtual model of a first dental restoration.

The method comprises the steps of:
  determining a second virtual space available for accommodation of a second dental restoration for a second tooth to be restored by capturing the shape of a second patient's teeth at least in an area adjacent the second tooth to be restored;
  retrieving the same predefined virtual master dental restoration surface from the database;
  fitting the virtual master dental restoration surface in the second space by three-dimensionally transforming the virtual master dental restoration model to provide a second virtual outer dental restoration surface;
  creating a second virtual inner dental restoration surface independent of a shape of the second tooth to be restored;
  providing a virtual model of a second dental restoration based on a combination of the second virtual outer dental restoration surface and the second virtual inner dental restoration surface; and
  fabricating the second dental restoration based on the second dental restoration model.

In the method the finished second dental restoration may have an outer shape that corresponds to the outer shape of the dental restoration or a three-dimensionally proportionally scaled shape thereof.

DETAILED DESCRIPTION OF THE INVENTION

Figure 1:
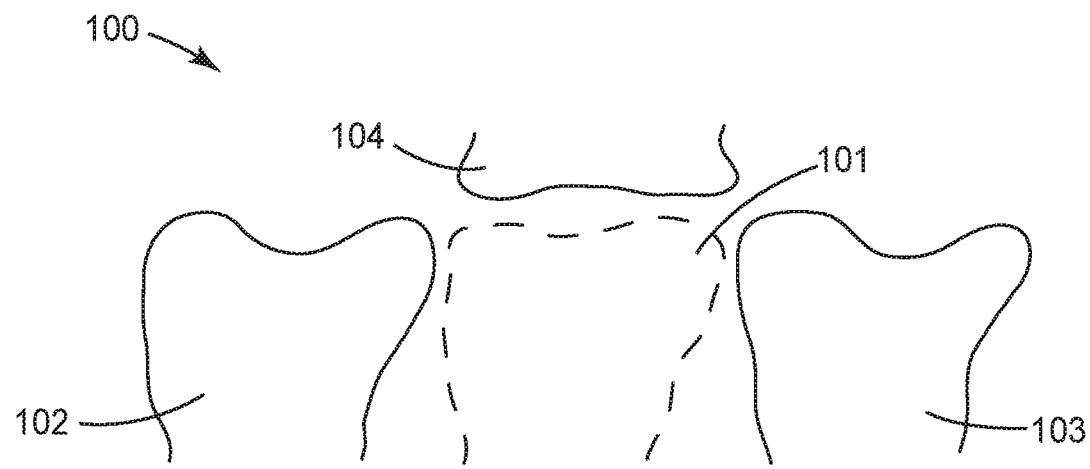
FIG. 1 is a schematic view of a virtual situation of a patient's teeth in a method according to an embodiment of the invention.

FIG. 1 illustrates a patient's teeth 100 captured from a patient's mouth in and adjacent an area of a tooth to be restored 101. Although the Figure illustrates only the directly adjacent teeth 102, 103 and the antagonist 104 in another example more (or less) teeth may be captured as appropriate. For example, a full quadrant of the patient's teeth, two opposite quadrants or one or both full arches may be captured as necessary.

As illustrated, the tooth to be restored 101 is not yet prepared. Although any defect of the tooth 101 is not illustrated, in another example the tooth to be restored may be incomplete, for example may lack one or more portions.

Preferably, the patient's teeth are captured by intra-oral scanning. It is however possible to first make one or more physical dental impressions from which one or more plaster models are obtained, which finally are scanned. By capturing the shape of the patient's teeth at least in the area adjacent the tooth to be restored 101 a space (105 in FIG. 2) available for accommodation of a dental restoration is determined.

Figure 2:
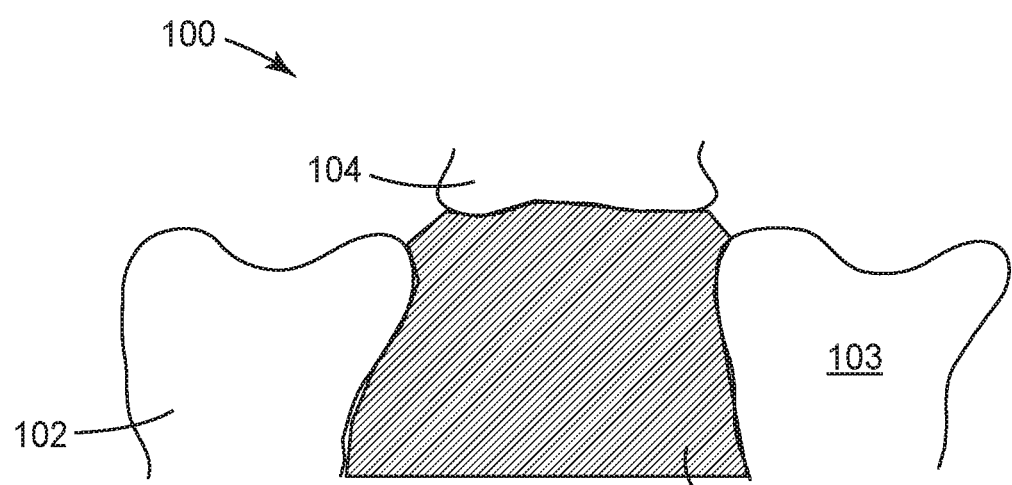
FIG. 2 is a schematic illustration of a step of determining a space for a dental restoration in a method according to an embodiment of the invention.

FIG. 2 illustrates the space 105 that is available for accommodation of the dental restoration. The space 105 is determined by boundaries of the teeth 102, 103, 104. Although the space 105 is illustrated as a dedicated area between adjacent and opposite teeth 102, 103, 104 it is noted that the space 105 itself may or may not be in the form of a separate virtual model.

Figure 3:
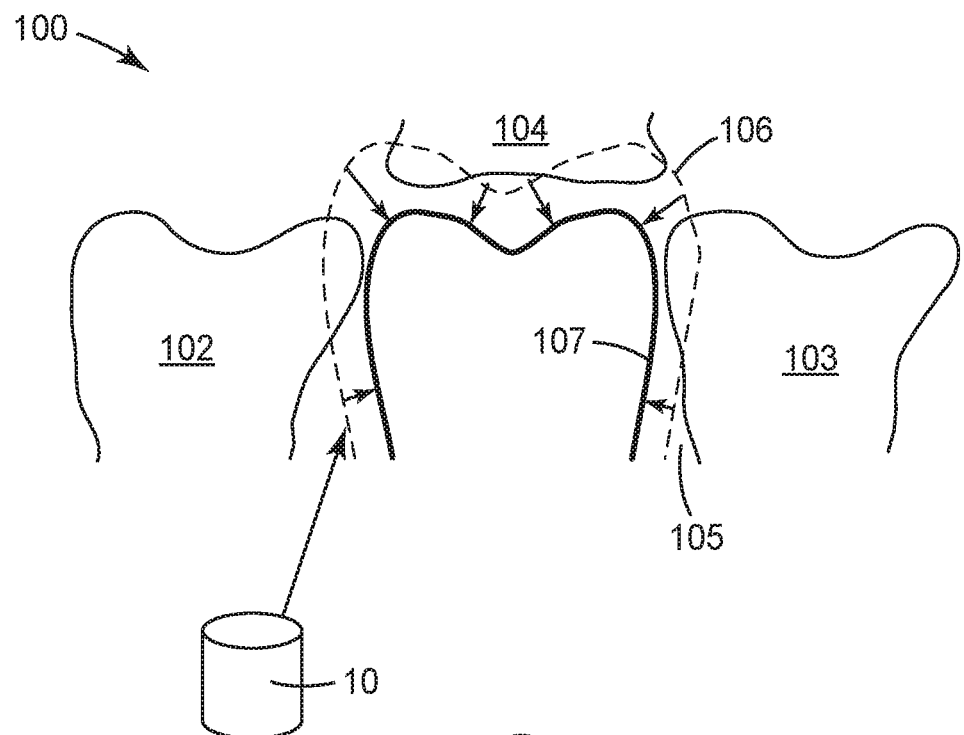
FIG. 3 is a schematic illustration of a step of three-dimensionally transforming a virtual master dental restoration surface in a method according to an embodiment of the invention.

FIG. 3 illustrates the retrieving of a virtual master dental restoration surface 106 from a database 10. The virtual master dental restoration surface may be part of a virtual standard dental restoration model that has a virtual inner and an outer surface of which the virtual outer surface forms the virtual master dental restoration surface. In the example shown the virtual master dental restoration surface 106 is a surface only. As illustrated, the virtual master dental restoration surface 106 may have a default size which may not fit the space 105 between the teeth 102, 103 and 104. However, according to the method of the invention the virtual master dental restoration surface 106 can be fitted in the space 105 by three-dimensionally proportionally scaling (enlargement or reduction). Thus, a virtual outer dental restoration surface 107 is provided. As shown, the virtual outer dental restoration surface 107 is provided without performing a design step that modifies only isolated portions the of the virtual master dental restoration surface 106. For example, the virtual master dental restoration surface 106 is not only partially modified but the overall shape is scaled. This is in contrast to prior art methods in which a master model may be used but in which the master model is customized to a patient's dental situation by computer aided but manually controlled design steps.

Figure 4:
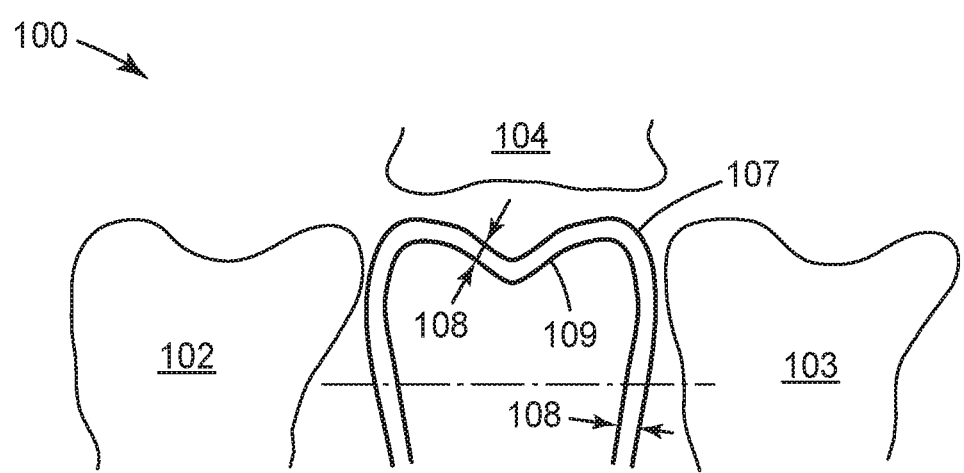
FIG. 4 is a schematic illustration of a step of creating an virtual inner dental restoration surface in a method according to an embodiment of the invention.

FIG. 4 illustrates the creation of a virtual inner dental restoration surface 109. The virtual inner dental restoration surface 109 is created automatically by computer aid. In particular, the virtual inner dental restoration surface 109 performed by three-dimensionally equidistant shifting, in particular reduction, of the virtual outer dental restoration surface 107 by a common offset 108. Accordingly, the virtual outer and inner dental restoration surface 107, 109 are equidistant. This may be performed by shifting each of the coordinates defining the virtual outer dental restoration surface 107 by the offset 108 in a direction perpendicular to the surface portion at the coordinate of the virtual outer dental restoration surface 107. In this regard the term "shifting" is understood in a figurative sense and covers, in practice, for example the creation of a new coordinate by calculation from the original coordinate and deleting the original coordinate. Other ways of performing a three-dimensional equidistant reduction are possible.

Figure 5:
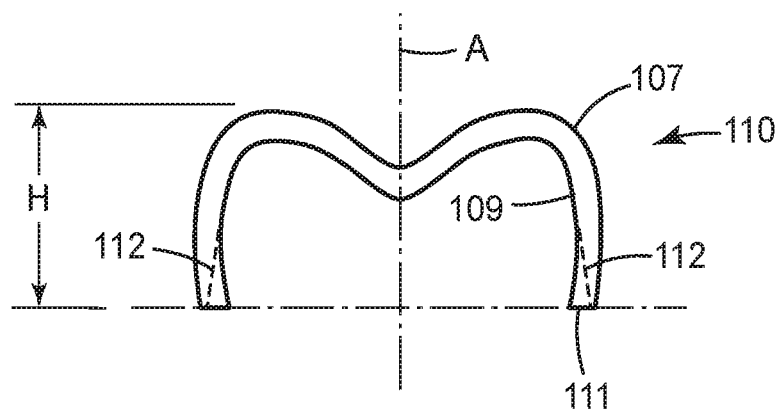
FIG. 5 is a schematic illustration of a step of determining a height of a dental restoration in a method according to an embodiment of the invention.

FIG. 5 illustrates the determination a height H of the dental restoration model. The height H is defined by a dimension of the dental restoration model along a tooth axis A. The determination of the Height H may be performed automatically by a computer, for example based on a predetermined standard height stored in the computer. Alternatively, the determination of the Height H may be performed manually, for example by manually entering the desired height or by manually indicating a cutting line at which the virtual inner and outer dental restoration surface are trimmed for determining the height of the dental restoration model. The step of determining the height is performed independent from the preparation of the tooth to be restored. Therefore during the preparation of the dental restoration the tooth to be restored is still not prepared. Once the height H of the dental restoration model is determined the dental restoration model is created by closing any gaps between the virtual inner and outer dental restoration surface 107, 109. In particular, an additional surface 111 that bridge a gap between the virtual inner and outer dental restoration surface 107, 109 may be (preferably automatically) added. Alternatively, the free end of the virtual inner dental restoration surface 109 may be conformed to the free end of the virtual outer dental restoration surface 107 (as indicated by the dashed lines 112 in the Figure).

The so finished (still virtual) dental restoration model 110 is provided to a machine for fabricating the dental restoration. For example, the dental restoration model 110 may be provided in the form of a STL file or any other appropriate file format. The machine is preferably a 3D printing machine, for example one which is operating by processing light hardenable materials.

Figure 6:
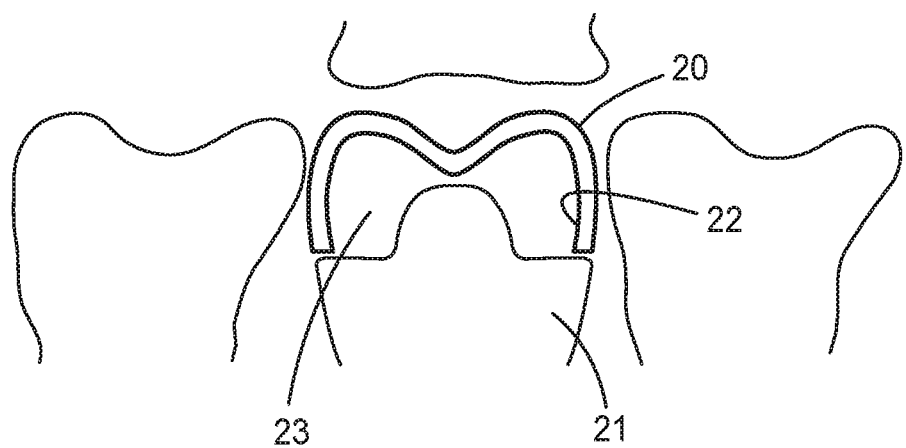
FIG. 6 is a schematic view of a physical situation of the patient's teeth with a dental restoration placed on a tooth to be restored.

FIG. 6 illustrates the physical fabricated dental restoration 20 placed on the physical tooth to be restored 21. The tooth to be restored 21 is prepared from receiving the dental restoration 20. This means that a dentist has ground the tooth to be restored to a shape (typically a stump) that allows the dental restoration 20 to be mounted on the tooth to be restored 21. Other than in prior art methods, the shape of the prepared tooth to be restored 21 differs from the inner shape 22 of the dental restoration. In particular, the dental restoration 20 in combination with the prepared tooth to be restored 21 forms a wide gap that is filled with a dental material, for example a dental cement. The preparation of the tooth to be restored can start after the fabrication of the dental restoration. Accordingly, the treatment of the patient for providing the patient with a dental restoration does not need to be interrupted for the preparation of the dental restoration but can be completed in one contiguous process. Generally, the treatment is perceived more inconvenient if interrupted and divided in two sessions. By the method of the invention, the treatment time (including any interruptions) can be minimized. This qualifies the method of the invention particularly for pediatric dentistry.

What is claimed is:

1. A method of making a dental restoration,:
   determining a virtual space available for accommodation of a dental restoration for a tooth to be restored by capturing the shape of a patient's teeth at least in an area adjacent the tooth to be restored;
   retrieving a predefined virtual master dental restoration surface from a database;
   fitting the virtual master dental restoration surface in the space by three-dimensionally transforming the virtual master dental restoration surface to provide a virtual outer dental restoration surface;
   creating a virtual inner dental restoration surface independent of a shape of the tooth to be restored;
   providing a virtual model of a dental restoration based on a combination of the virtual outer dental restoration surface and the virtual inner dental restoration surface; and
   fabricating the dental restoration based on the dental restoration model.

2. The method of claim 1, wherein the virtual inner dental restoration surface is generated by a computer, based on the virtual outer dental restoration surface.

3. The method of claim 1, wherein at least a portion of the virtual inner dental restoration surface is generated as a three-dimensional equidistant reduction of a corresponding portion of the virtual outer dental restoration surface based on an offset value that is representative of a wall thickness of the dental restoration.

4. The method of claim 3, wherein the wall thickness is between 0.3 mm and 1.5 mm.

5. The method of claim 1, wherein the three-dimensional transformation is performed by three-dimensionally proportionally scaling of the virtual master dental restoration surface.

6. The method of claim 1, further comprising determining a height of the dental restoration model independent of any preparation margin of the tooth to be restored, wherein the dental restoration model has a tooth axis and wherein the height is defined by a dimension of the dental restoration model along the tooth axis.

7. The method of claim 6, further comprising virtually trimming the dental restoration model based on the height.

8. The method of claim 1, further comprising determining a tooth color for the dental restoration and providing a dental material from which the dental restoration is fabricated based on the tooth color.

9. The method of claim 1, wherein the dental restoration is fabricated by 3D printing of a light hardenable resin.

10. The method of claim 9, wherein the light hardenable resin is based on a composition comprising: reactive monomers, photo initiators.

11. The method of claim 1, wherein the finished dental restoration has an outer shape that corresponds to the shape of the virtual outer dental restoration surface or a three-dimensionally proportional reduction or enlargement thereof.

12. The method of claim 1, wherein the shape of the patient's teeth are captured by intra-oral optical scanning.

13. The method of claim 1, further comprising displaying, in combination, (i) the shape of the patient's teeth at least in the area adjacent the tooth to be restored and (ii) the virtual master dental restoration surface, and wherein the fitting of the virtual master dental restoration model into the space is performed by a user by optical control based on the combination (i) and (ii) displayed.

14. The method of claim 1, being performed prior to any invasive treatment of the tooth to be restored.

15. The method of claim 1, comprising:
   determining a second virtual space available for accommodation of a second dental restoration for a second tooth to be restored by capturing the shape of a second patient's teeth at least in an area adjacent the second tooth to be restored;
   retrieving the same predefined virtual master dental restoration surface from the database;
   fitting the virtual master dental restoration surface in the second space by three-dimensionally transforming the virtual master dental restoration model to provide a second virtual outer dental restoration surface;
   creating a second virtual inner dental restoration surface independent of a shape of the second tooth to be restored;
   providing a virtual model of a second dental restoration based on a combination of the second virtual outer dental restoration surface and the second virtual inner dental restoration surface; and
   fabricating the second dental restoration based on the second dental restoration model.

* * * * *